US012602055B2

(12) United States Patent
Urakawa et al.

(10) Patent No.: US 12,602,055 B2
(45) Date of Patent: Apr. 14, 2026

(54) VEHICULAR SYSTEM

(71) Applicant: Aichi Steel Corporation, Tokai (JP)

(72) Inventors: Kazuo Urakawa, Tokai (JP); Shogo Okazaki, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 321 days.

(21) Appl. No.: 18/573,584

(22) PCT Filed: Jun. 14, 2022

(86) PCT No.: PCT/JP2022/023852
§ 371 (c)(1),
(2) Date: Dec. 22, 2023

(87) PCT Pub. No.: WO2022/270365
PCT Pub. Date: Dec. 29, 2022

(65) Prior Publication Data
US 2024/0302842 A1     Sep. 12, 2024

(30) Foreign Application Priority Data
Jun. 25, 2021     (JP) ................................. 2021-105627

(51) Int. Cl.
*G05D 1/244*          (2024.01)
*G05D 1/246*          (2024.01)
(Continued)

(52) U.S. Cl.
CPC ............. *G05D 1/244* (2024.01); *G05D 1/246* (2024.01); *G06K 7/10297* (2013.01);
(Continued)

(58) Field of Classification Search
None
See application file for complete search history.

(56) References Cited

U.S. PATENT DOCUMENTS

2015/0294430 A1 * 10/2015 Huang ..................... G08G 1/22
                                                                      701/2
2018/0157878 A1 * 6/2018 Kovarik .................. G01S 13/74
(Continued)

FOREIGN PATENT DOCUMENTS

CN          104153267 A     11/2014
EP           3789985 A1      3/2021
(Continued)

OTHER PUBLICATIONS

International Search Report and Written Opinion mailed on Aug. 2, 2022, received for PCT Application PCT/JP2022/023852, filed on Jun. 14, 2022, 10 pages including English Translation.

*Primary Examiner* — Amelia Vorce
(74) *Attorney, Agent, or Firm* — XSENSUS LLP

(57) ABSTRACT

A vehicular system includes a measuring unit attached to a vehicle to detect a magnetic marker laid along a traveling road, a database storing position information of the magnetic marker, and a control unit that acquires the position information of the magnetic marker by referring to a storage area of the database. The database has stored therein position information of each magnetic marker to which a distance from a reference point on the traveling road as a starting point to each magnetic marker is linked. By referring to the database by using a distance traveled until the magnetic marker is detected after the vehicle passes over the reference point, position information of newly detected magnetic marker is acquired.

20 Claims, 9 Drawing Sheets

(51) Int. Cl.

| | |
|---|---|
| *G05D 105/80* | (2024.01) |
| *G05D 107/13* | (2024.01) |
| *G05D 109/10* | (2024.01) |
| *G06K 7/10* | (2006.01) |

(52) U.S. Cl.
CPC ..... G06K 7/10386 (2013.01); *G05D 2105/80* (2024.01); *G05D 2107/13* (2024.01); *G05D 2109/10* (2024.01)

(56) References Cited

U.S. PATENT DOCUMENTS

| | | | |
|---|---|---|---|
| 2019/0098468 A1* | 3/2019 | Yamamoto | G08G 1/096716 |
| 2019/0194886 A1 | 6/2019 | Yamamoto et al. | |
| 2019/0196496 A1* | 6/2019 | Yamamoto | B62D 15/0295 |
| 2020/0012294 A1 | 1/2020 | Yamamoto et al. | |
| 2020/0133299 A1 | 4/2020 | Yamamoto et al. | |
| 2020/0320870 A1 | 10/2020 | Yamamoto et al. | |
| 2020/0354907 A1 | 11/2020 | Yamamoto et al. | |
| 2021/0221359 A1 | 7/2021 | Yamamoto et al. | |
| 2022/0128365 A1* | 4/2022 | Berkovich | G01C 21/005 |
| 2023/0205225 A1* | 6/2023 | Leefer | G05D 1/247 180/168 |
| 2023/0250598 A1 | 8/2023 | Yamamoto et al. | |
| 2024/0010189 A1 | 1/2024 | Yamamoto et al. | |
| 2024/0086841 A1* | 3/2024 | Schoening | G06K 19/07773 |
| 2024/0160871 A1* | 5/2024 | Kovarik | G06K 7/10376 |
| 2025/0123629 A1* | 4/2025 | Suzuki | A01D 34/008 |
| 2025/0225352 A1* | 7/2025 | Kovarik | G06K 7/10376 |

FOREIGN PATENT DOCUMENTS

| | | |
|---|---|---|
| EP | 4174608 A1 | 5/2023 |
| JP | S59-195794 A | 11/1984 |
| JP | H02-111206 A | 4/1990 |
| JP | H10-160486 A | 6/1998 |
| JP | 2001-325691 A | 11/2001 |
| JP | 2007-276626 A | 10/2007 |
| JP | 2017-141594 A | 8/2017 |
| JP | 2018-169301 A | 11/2018 |
| JP | 2020-166525 A | 10/2020 |
| WO | 2017/217423 A1 | 12/2017 |
| WO | 2020/138467 A1 | 7/2020 |

* cited by examiner

FIG. 5

| COUNT NO. | TAG ID | DISTANCE (M) | ATTRIBUTE INFORMATION | |
|---|---|---|---|---|
| | | | POSITION INFORMATION | ROAD TYPE |
| 0 | A186B | 0 | LATITUDE ××× LONGITUDE ∘∘∘ | NATIONAL ROAD |
| 1 | NULL | 5 | LATITUDE ××× LONGITUDE ∘∘∘ | NATIONAL ROAD |
| 2 | NULL | 10 | LATITUDE ××× LONGITUDE ∘∘∘ | NATIONAL ROAD |
| 3 | NULL | 15 | LATITUDE ××× LONGITUDE ∘∘∘ | NATIONAL ROAD |
| 4 | NULL | 20 | LATITUDE ××× LONGITUDE ∘∘∘ | NATIONAL ROAD |
| 5 | NULL | 25 | LATITUDE ××× LONGITUDE ∘∘∘ | NATIONAL ROAD |
| 6 | NULL | 30 | LATITUDE ××× LONGITUDE ∘∘∘ | NATIONAL ROAD |
| 7 | NULL | 35 | LATITUDE ××× LONGITUDE ∘∘∘ | NATIONAL ROAD |

FIG. 8

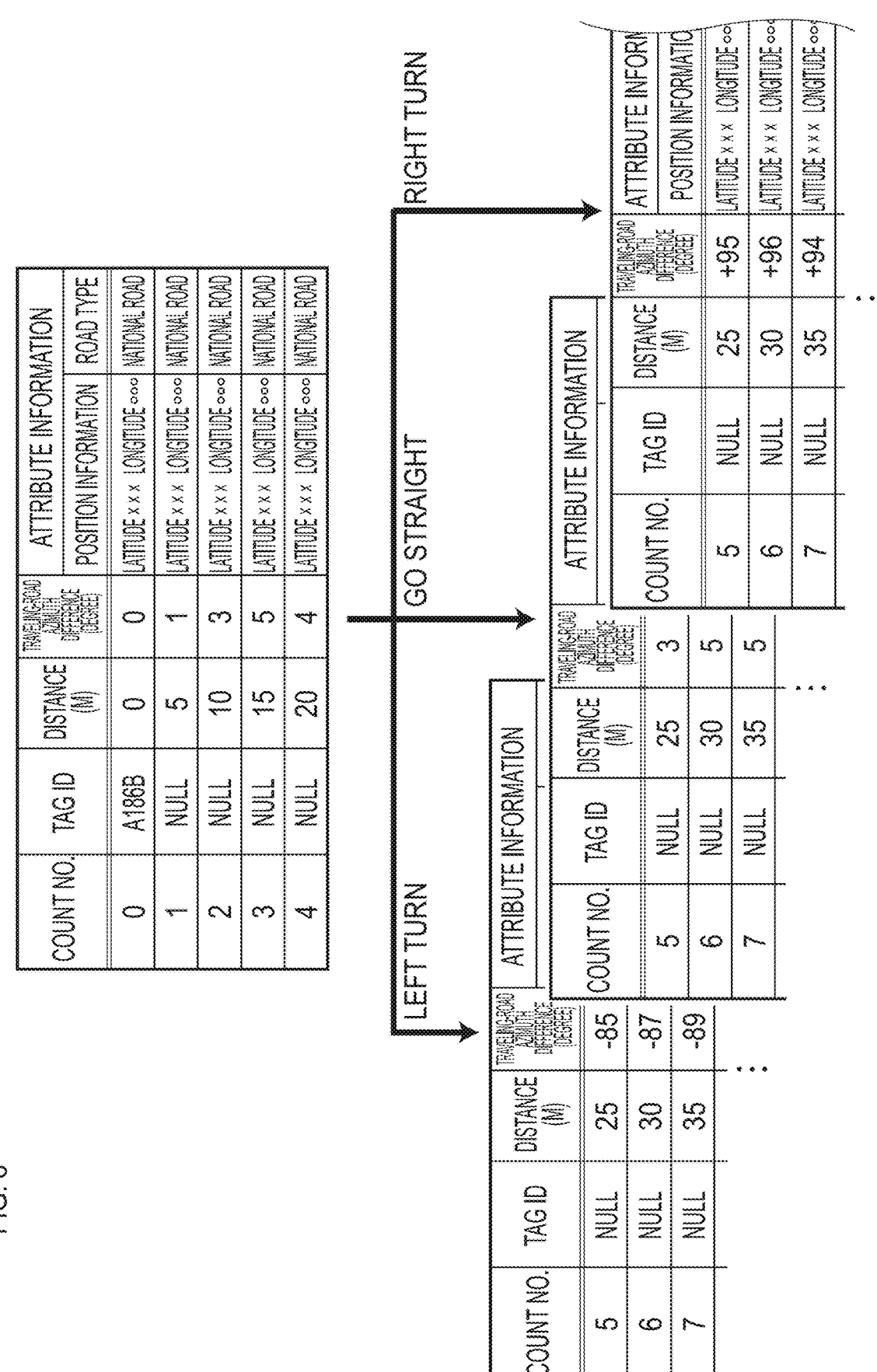

| COUNT NO. | TAG ID | DISTANCE (M) | TRAVELING-ROAD AZIMUTH DIFFERENCE (DEGREE) | ATTRIBUTE INFORMATION | |
|---|---|---|---|---|---|
| | | | | POSITION INFORMATION | ROAD TYPE |
| 0 | A186B | 0 | 0 | LATITUDE x x x LONGITUDE ○○○ | NATIONAL ROAD |
| 1 | NULL | 5 | 1 | LATITUDE x x x LONGITUDE ○○○ | NATIONAL ROAD |
| 2 | NULL | 10 | 3 | LATITUDE x x x LONGITUDE ○○○ | NATIONAL ROAD |
| 3 | NULL | 15 | 5 | LATITUDE x x x LONGITUDE ○○○ | NATIONAL ROAD |
| 4 | NULL | 20 | 4 | LATITUDE x x x LONGITUDE ○○○ | NATIONAL ROAD |

GO STRAIGHT

RIGHT TURN

| COUNT NO. | TAG ID | DISTANCE (M) | TRAVELING-ROAD AZIMUTH DIFFERENCE (DEGREE) | ATTRIBUTE INFORMATION |
|---|---|---|---|---|
| | | | | POSITION INFORMATION |
| 5 | NULL | 25 | +95 | LATITUDE x x x LONGITUDE ○○○ |
| 6 | NULL | 30 | +96 | LATITUDE x x x LONGITUDE ○○○ |
| 7 | NULL | 35 | +94 | LATITUDE x x x LONGITUDE ○○○ |

. . .

| COUNT NO. | TAG ID | DISTANCE (M) | TRAVELING-ROAD AZIMUTH DIFFERENCE (DEGREE) | ATTRIBUTE INFORMATION |
|---|---|---|---|---|
| 5 | NULL | 25 | 3 | |
| 6 | NULL | 30 | 5 | |
| 7 | NULL | 35 | 5 | |

. . .

LEFT TURN

| COUNT NO. | TAG ID | DISTANCE (M) | TRAVELING-ROAD AZIMUTH DIFFERENCE (DEGREE) | ATTRIBUTE INFORMATION |
|---|---|---|---|---|
| 5 | NULL | 25 | -85 | |
| 6 | NULL | 30 | -87 | |
| 7 | NULL | 35 | -89 | |

. . .

VEHICULAR SYSTEM

CROSS-REFERENCE TO RELATED APPLICATIONS

The present application is based on PCT filing PCT/JP2022/023852, filed Jun. 14, 2022, which claims priority from Japanese Patent Application No. 2021-105627, filed Jun. 25, 2021, the entire contents of each are incorporated herein by reference.

TECHNICAL FIELD

The present invention relates to a vehicular system for using magnetic markers.

BACKGROUND ART

Conventionally, a system for assisting driving for keeping a lane by using magnetic markers laid along a road has been known (for example, refer to Patent Literatures 1 and 2 below). In this driving assist system, a lateral shift amount of the vehicle with respect to each magnetic marker arrayed along the center of a lane is measured for use in lane departure warning and lateral control.

CITATION LIST

Patent Literature

Patent Literature 1: Japanese Unexamined Patent Application Publication No. 2017-141594
Patent Literature 2: Japanese Unexamined Patent Application Publication No. 2018-169301

SUMMARY OF INVENTION

Technical Problem

With reference to the magnetic markers arrayed along the center of the lane, a deviation of the vehicle position in the lane in the vehicle-width direction can be grasped, but it is difficult to uniquely identify a magnetic marker detected by the vehicle, posing a problem in which it is difficult to acquire attribute information of the magnetic marker such as position information.

The present invention was made in view of the above-described conventional problem, and is to provide a vehicular system that can uniquely identify a magnetic marker and acquire attribute information with high certainty.

Solution to Problem

The present invention resides in a vehicular system for acquiring attribute information of a magnetic marker laid along a traveling road while a vehicle is traveling, including:
a magnetic sensor attached to the vehicle to detect the magnetic markers;
a distance identifying part to identify a distance traveled by the vehicle;
a database having the attribute information of the magnetic markers stored therein; and
an information acquiring part that acquires the attribute information of a magnetic marker detected by the vehicle by referring to a storage area of the database, wherein the database has stored therein the attribute information of the magnetic markers to which information that can identify a distance from a reference point on the traveling road as a starting point to each of the magnetic markers is linked, and
the information acquiring part acquires the attribute information of the magnetic marker detected by the vehicle by referring to the database by using the distance traveled after the vehicle passes over the reference point until the magnetic marker is detected.

The vehicular system of the present invention includes, in addition to the magnetic sensor for use in detection of magnetic markers, the distance identifying part to identify the distance travelled. In the database configuring this vehicular system, the attribute information of each of the magnetic markers is stored so as to have information that can identify the distance from the reference point on the traveling road as the starting point to each of the magnetic markers linked thereto.

In the vehicular system of the present invention, by referring to the database by using the distance travelled by the vehicle after passing over the reference point, it is possible to identify the magnetic marker detected by the vehicle and acquire the attribute information of that magnetic marker.

BRIEF DESCRIPTION OF DRAWINGS

FIG. 5 is a descriptive diagram of a data map for each reference magnetic marker in the first embodiment.
FIG. 8 is a descriptive diagram of a data map for each reference magnetic marker in the second embodiment.

DESCRIPTION OF EMBODIMENTS

Figure 1:
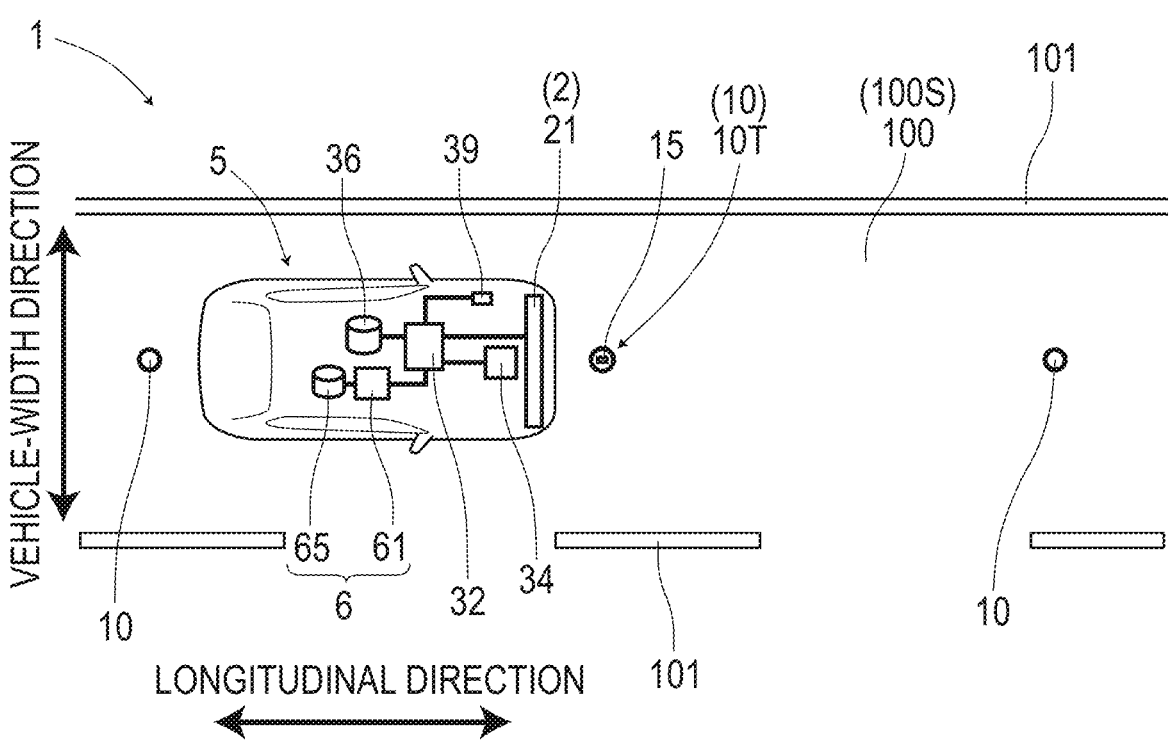
FIG. 1 is a structural diagram a vehicular system in a first embodiment.

Embodiments of the present invention are specifically described by using the following embodiments.

First Embodiment

The present embodiment is an example regarding vehicular system 1 that can provide vehicle 5 which detects magnetic markers 10 with attribute information of that magnetic marker 10. Details of this are described with reference to FIG. 1 to FIG. 6.

Vehicular system 1 (FIG. 1) is a system that acquires attribute information of magnetic markers 10 laid along a road forming one example of a traveling road while vehicle 5 is traveling. In the configuration of the present embodiment, magnetic markers 10 are arrayed along the center of lane 100 sectioned by left and right lane marks 101.

Magnetic markers 10 arrayed along lane 100 include a reference magnetic markers. In FIG. 1 the reference magnetic marker is provided with sign 10T for differentiation from the other non-reference magnetic markers. Reference magnetic marker 10T retains RFID (Radio Frequency Identification) tag 15. Vehicle 5 identifies magnetic marker 10 newly detected by using a distance traveled after passing over reference magnetic marker 10T and so forth to acquire attribute information of that magnetic marker 10. As attribute information of magnetic marker 10, position information indicating the laying position of magnetic marker 10, information indicating the type of road, lane, or the like, are provided.

Note that vehicular system 1 of the present embodiment can be combined with, for example, navigation system 6 included in vehicle 5. Navigation system 6 is configured of navigation ECU 61 for achieving a navigation function and map database (map DB) 65 for storing detailed three-dimensional map data (3D map data). Although detailed description is omitted, navigation ECU 61 uses a own vehicle position identified by vehicular system 1 to perform peripheral map display, route guide by image display, voice output, or the like, and so forth.

Figure 2:
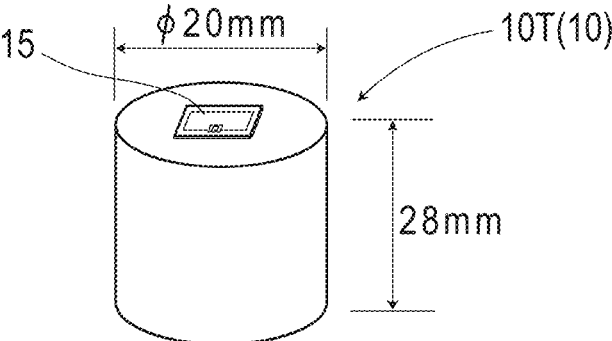
FIG. 2 is a diagram depicting a magnetic marker to which an RFID tag is attached in the first embodiment.

Magnetic marker 10 is, as in FIG. 2, a magnet forming a columnar shape having a diameter of 20 mm and a height of 28 mm. This magnetic marker 10 is laid in a state of, for example, being accommodated in a hole bored in road surface 100S. In the present embodiment, magnetic markers 10 are laid with, for example, five-meter pitches, along lane 100. The magnet as magnetic marker 10 is an isotropic ferrite plastic magnet having magnetic powder of iron oxide as a magnetic material dispersed into a polymer material as a base material.

Reference magnetic marker 10T, which is part of magnetic markers 10, retains RFID tag 15 that wirelessly outputs information, as in FIG. 1 and FIG. 2. RFID tag 15 is a sheet-shaped electronic component, and is arranged on an end face of the magnet forming magnetic marker 10T. RFID tag 15 is a passive-type tag, and operates by external wireless power feeding and outputs tag information including a tag ID as identification information. The tag ID is identification information of RFID tag 15, and can be used to identify its corresponding reference magnetic marker 10T.

Reference magnetic marker 10T is laid on the traveling road so that RFID tag 15 is positioned on the top side. Among magnetic markers 10 arrayed as spaced along lane 100, reference magnetic marker 10T may be arranged with an appropriate space, or may be arranged at a characteristic position such as a branch position, a merge position, or a temporary stop position.

Figure 3:
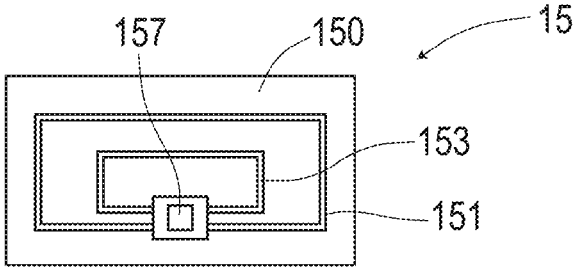
FIG. 3 is a front view of the RFID tag in the first embodiment.

RFID tag 15 is, as in FIG. 3, an electronic component having IC chip 157 implemented on a surface of tag sheet 150 cut out from, for example, a PET (PolyEthylene Terephthalate) film. On the surface of tag sheet 150, a printed pattern of loop coil 151 and antenna 153 is provided. Loop coil 151 is a power-receiving coil where exciting current is generated by external electromagnetic induction. Antenna 153 is a transmission antenna for wireless transmission of the tag information. As RFID tag 15, a UHF-band wireless tag is preferably adopted.

Vehicular system 1 of the present embodiment is a vehicle onboard system mounted on vehicle 5. Vehicle 5 includes, as the configuration of vehicular system 1: wheel speed sensor 39 that detects rotation of a wheel; tag reader 34 that acquires tag information from RFID tag 15; measuring unit 2 that detects magnetic markers 10; control unit 32 that controls tag reader 34, measuring unit 2, or the like; database 36 that stores attribute information of magnetic markers 10; and so forth.

Figure 4:
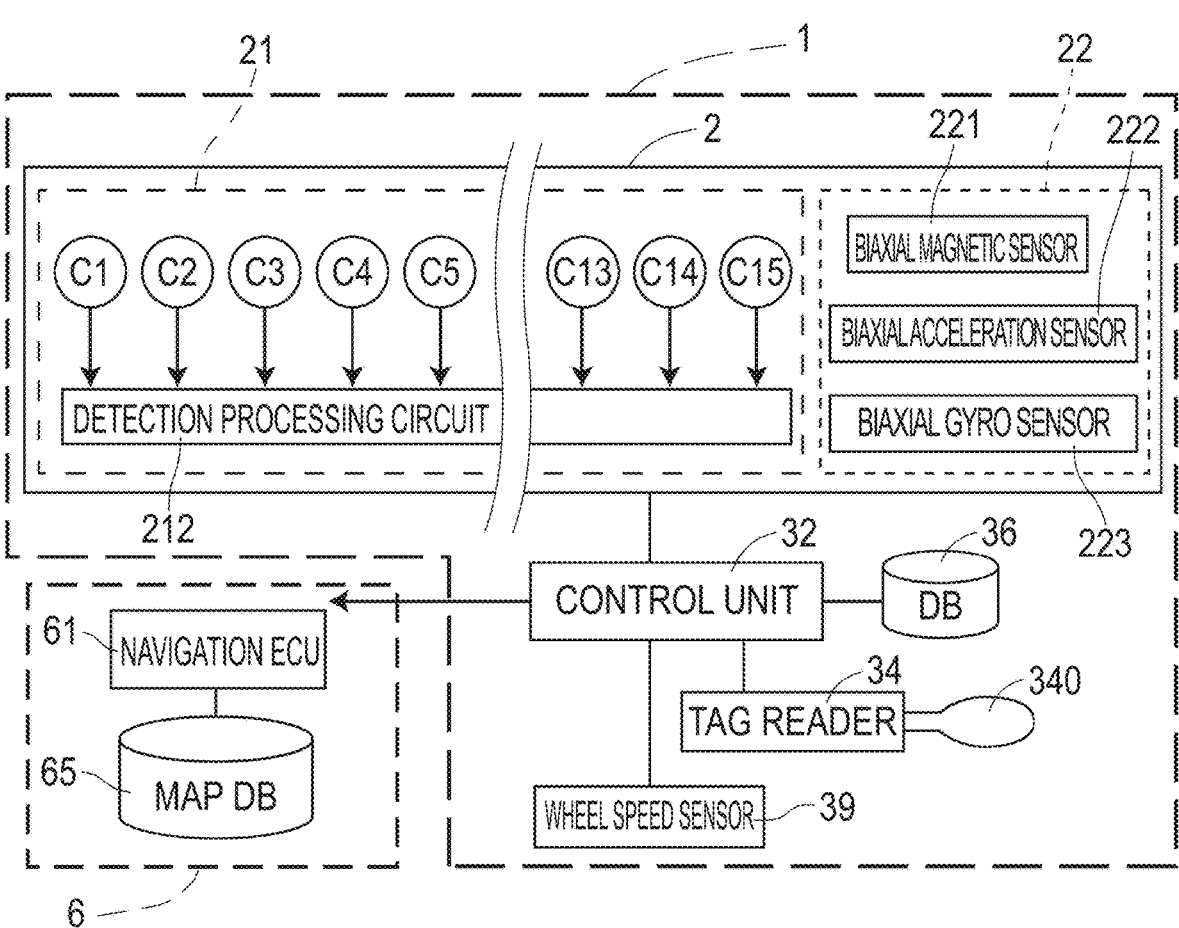
FIG. 4 is a block diagram depicting electrical structure of the vehicular system in the first embodiment.

Tag reader 34 is, as in FIG. 1 and FIG. 4, a communication unit including wireless antenna 340. Tag reader 34 is arranged at a front portion of vehicle 5, such as, for example, inside the front bumper of vehicle 5. Tag reader 34 performs wireless communication with RFID tag 15 affixed to reference magnetic marker 10T. Tag reader 34 causes RFID tag 15 to operate by wireless power feeding, and acquires tag information wirelessly transmitted (outputted) from RFID tag 15. Note that tag reader 34 inputs the acquired tag information to control unit 32 as occasion arises.

Measuring unit 2 is, as in FIG. 1 and FIG. 4, a unit having integrated therein sensor array 21 including magnetic sensors Cn and IMU (Inertial Measurement Unit) 22 that allows positioning by inertial navigation. Measuring unit 2 is an elongated rod-shaped unit. Measuring unit 2 is attached for example, inside the front bumper of vehicle 5, as being in a state along a vehicle-width direction. Measuring unit 2 is attached as being in a state of facing road surface 100S in parallel. In the present embodiment, the attachment height of measuring unit 2 with reference to road surface 100S is 200 mm.

Sensory array 21 (FIG. 4) includes fifteen magnetic sensors Cn (n is an integer from 1 to 15) and detection processing circuit 212 having a CPU (Central Processing Unit) and so forth not depicted incorporated therein. The plurality of magnetic sensors Cn are arrayed on a straight line along a longitudinal direction of measuring unit 2. The pitch of magnetic sensors Cn an equal pitch of 10 cm. Sensor array 21 is attached to vehicle 5 so that center magnetic sensor C8 is positioned at the center in the vehicle-width direction. As magnetic sensor Cn, for example, an MI sensor can be adopted, which detects magnetism by using the known MI effect (Magnet Impedance Effect), in which the impedance of a magneto-sensitive body such as an amorphous wire sensitively changes in response to the external magnetic field.

Detection processing circuit 212 (FIG. 4) included in sensor array 21 is an arithmetic circuit that performs marker detection process for detecting magnetic marker 10. This detection processing circuit 212 is, although omitted in the drawing, configured by using, in addition to a CPU that performs various arithmetic operations, memory elements such as a ROM (Read Only Memory) and a RAM (Random Access Memory), and so forth.

Detection processing circuit 212 acquires sensor signals outputted from each magnetic sensor Cn at a frequency of 3 kHz to perform marker detection process. In marker detection process, in addition to detection of magnetic marker 10, measurement of a lateral shift amount of vehicle 5 with respect to magnetic marker 10 and so forth are performed. Upon executing marker detection process, detection processing circuit 212 inputs its result to control unit 32.

IMU 22 (FIG. 4) incorporated in measuring unit 2 is an inertial navigation unit for estimating a relative position of vehicle 5 by inertial navigation. IMU 22 acquires a measurement value required for estimating a relative position of the vehicle 5 by inertial navigation. IMU 22 includes biaxial magnetic sensor 221 which is an electronic compass that measures azimuth, biaxial acceleration sensor 222 that measures acceleration, biaxial gyro sensor 223 that measures angular velocity, and so forth. In particular, if based on a measurement signal of IMU 22, it is possible to identify an angular displacement amount, displacement speed (yaw rate) of a vehicle azimuth, or the like. IMU 22 forms one example of an azimuth estimating part that estimates an absolute azimuth of the orientation of the vehicle or a relative azimuth representing a change in the orientation of the vehicle.

Control unit 32 is, as in FIG. 4, a unit to control tag reader 34 and measuring unit 2 and acquires attribute information of magnetic marker 10. Control unit 32 includes an electronic substrate (omitted in the drawing) on which are implemented memory elements such as a ROM and a RAM, and so forth, in addition to a CPU that performs various arithmetic operations.

To control unit 32, wheel speed sensor 39 described above and a storage device (omitted in the drawing) such as a hard disk drive are connected. Database 36 having attribute information of each magnetic marker 10 stored therein is constructed by using the storage area of this storage device. Wheel speed sensor 39 is a sensor that outputs a pulse signal once every time the wheel rotates by a predetermined amount. By multiplying the number of times of outputs of pulse signals by wheel speed sensor 39 by a distance corresponding to the rotation having the above-described predetermined amount or adding the distance corresponding to the rotation having the predetermined amount every time the pulse signal is outputted and adding up together, it is possible to calculate a distance moved by vehicle 5. By combination with wheel speed sensor 39, control unit 32 configures a distance identifying part that identifies the distance traveled by vehicle 5.

Database 36 is a database storing attribute information of each of magnetic markers 10 and also the tag ID of RFID tag 15 affixed to reference magnetic marker 10T. Database 36 is configured to include, for example, a data map of FIG. 5 prepared for each of reference magnetic markers 10T. To each data map, the tag ID corresponding to reference magnetic marker 10T is linked. By using the tag ID to refer to database 36, the map data of reference magnetic marker 10T corresponding to that tag ID can be identified.

Data map (FIG. 5) is a data map having recorded thereon the attribute information of each of magnetic markers 10 arranged on a route from reference magnetic marker 10T as a starting point to first reference magnetic marker 10T on a downstream side. The attribute information of each of magnetic markers 10 including reference magnetic marker 10T constituting the starting point is, for example, position information of the latitude and the longitude, road type information, and so forth.

In data map (FIG. 5), to attribute information of each magnetic marker 10, distance information and a count number (count No.) are linked. The distance information is one example of information that can identify the distance from reference magnetic marker 10T as the starting point to corresponding magnetic marker 10. The count number is one example of information that can identify the ordinal position of corresponding magnetic marker 10 by taking reference magnetic marker 10T as the starting point.

Note that to attribute information of reference magnetic marker 10T, a tag ID is linked, in addition to distance information and the count number. On the data map, reference magnetic marker 10T can be immediately identified by the presence of the linked tag ID. As the tag ID linked to the data map, the tag ID linked to the attribute information of reference magnetic marker 10T may be used, or link data of the tag ID corresponding to the data map may be separately set.

Control unit 32 has a function as an information acquiring part that acquires the attribute information of newly detected magnetic marker 10 by referring to the storage area of database 36 including the data map of, for example, FIG. 5.

Control unit 32 as the information acquiring part selects a corresponding data map (for example, FIG. 5) by using the tag ID of reference magnetic marker 10T. Then, when new magnetic marker 10 is detected, one of magnetic markers 10 in the data map selected is identified by using the distance traveled by vehicle 5 or the number of times magnetic marker 10 detection after passing over reference magnetic marker 10T, and the attribute information of that magnetic marker 10 is read out.

Figure 6:
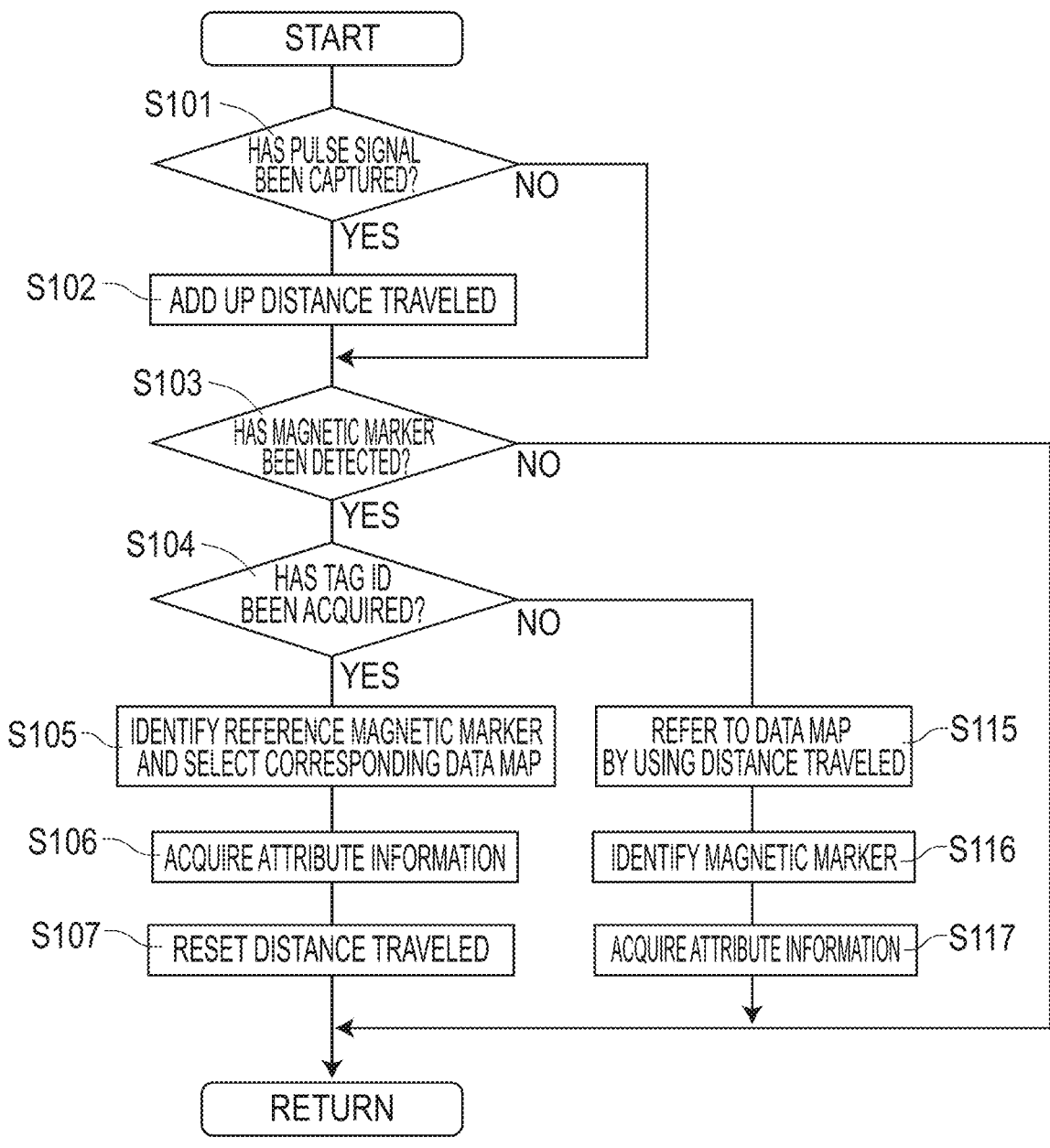
FIG. 6 is a flow diagram depicting a flow of operation of the vehicular system in the first embodiment.

Next, with reference to a flow diagram of FIG. 6, the operation of vehicular system 1, mainly control unit 32, is described. While vehicle 5 is traveling, every time control unit 32 captures the pulse signal of wheel speed sensor 39 (S101: YES), it adds up the distance traveled by vehicle 5 (S102). When magnetic marker 10 is detected (S103: YES), control unit 32 increments the number of times of magnetic marker 10 detection by one times, and determines whether it has acquired the tag ID of RFID tag 15 (S104).

If having acquired the tag ID (S104: YES), that is, when detected magnetic marker 10 is reference magnetic marker 10T, control unit 32 refers to database 36 by using the tag ID, and selects a data map to which that tag ID is linked (for example, FIG. 5) (S105). Then, control unit 32 identifies reference magnetic marker 10T in the data map, and acquires its attribute information (S106) and also resets the distance traveled being added up to zero (S107). Note that when the distance traveled is reset, the number of times of magnetic marker 10 is detected is preferably also reset at the same time.

On the other hand, if having detected magnetic marker 10 but not acquired the tag ID (S103: YES→S104: NO), control unit 32 determines that detected magnetic marker 10 is a non-reference magnetic marker 10. Then, control unit 32 refers to the data map selected at step S105 described above (S115). Note that the process following S104: No, when the tag ID is not acquired, is preferably performed after the detection of reference magnetic marker 10T. This is because the data map to be referred to is not selected before detection of reference magnetic marker 10T.

Control unit 32 finds, from the data map (for example, FIG. 5), magnetic marker 10 the (linked) distance and count number of which match the distance traveled being added up and the number of times of detection, and identifies it as magnetic marker 10 detected at step S103 described above (S116). Then, control unit 32 acquires attribute information of magnetic marker 10 identified as described above (S117). For example, by taking the laying position of magnetic marker 10 as a reference, it is possible to identify the vehicle position when that magnetic marker 10 is detected.

Here, if omission of detection of magnetic marker 10 occurs, when the data map (for example, FIG. 5) is referred to at step S115 described above, a problem occurs as follows. That is, a problem occurs in which, in the data map, the magnetic marker the (linked) distance of which matches the distance traveled being added up and the magnetic marker the (linked) count number of which matches the number of times of detection are different. In this case, as detected magnetic marker 10 the control unit 32 identifies the magnetic marker the distance of which matches the distance traveled being added up. The reason is as follows. If omission of detection of magnetic marker 10 occurs, the number of times of detection is less than the number of times of actual passing over magnetic marker 10. On the other hand, as for the distance traveled, the distance traveled is added up with high reliability in accordance with traveling of vehicle 5. Therefore, reliability is high.

Note that, during execution of the process loop of FIG. 6, control unit 32 identifies an angular displacement of the vehicle azimuth (orientation of the vehicle) based on the measurement signal of IMU 22. When the displacement of the vehicle azimuth exceeds a predefined threshold value, control unit 32 determines that vehicle 5 makes a right turn, left turn, or the like to enter a road branching off from the lane where magnetic markers 10 are arrayed. If control unit 32 determines branching of vehicle 5 as described above, it is preferable to suspend execution of the process loop of FIG. 6, erase the stored data of reference magnetic marker 10T and the distance traveled being added up and the number of times of magnetic marker 10 detection, wait for detection of new reference magnetic marker 10T. Note that as the above-described threshold value, it is preferable to define the threshold value in consideration of a shape specification, such as the curvature of the traveling road.

In vehicular system 1 of the present embodiment configured as described above, vehicle 5 has wheel speed sensor 39, and can identify its distance traveled. In database 36 configuring vehicular system 1, attribute information such as position information of each magnetic marker 10 is stored so as to have linked thereto information that can identify the distance from reference magnetic marker 10T, which is a reference point on the traveling road, as the starting point to each magnetic marker 10.

In vehicular system 1, at the time of passing over reference magnetic marker 10T, the corresponding data map (for example, FIG. 5) is selected by referring to database 36. Then, after passing over reference magnetic marker 10T, magnetic marker 10 newly detected is identified by referring to that data map using the distance traveled by vehicle 5 or the like is identified, and the attribute information of that magnetic marker is acquired. When magnetic marker 10 is identified by using the distance traveled, even if omission of detection of magnetic marker 10 occurs after passing over reference magnetic marker 10T, newly detected magnetic marker 10 can be identified with high certainty.

In the present embodiment, as a magnet forming magnetic marker 10, a columnar-shaped ferrite plastic magnet is exemplarily described, but a sheet-shaped ferrite rubber magnet may be adopted. A bond magnet formed by kneading magnetic powder into a binder formed of a polymer material such as rubber or plastic has a characteristic of high internal electrical resistance. By adopting the bond magnet, eddy currents that can occur inside the magnet when power required for operation of RFID tag 15 is transmitted can be suppressed, and power transmission efficiency can be improved. Note that the shape of the magnet forming magnetic marker 10 may be any shape other than the other than the columnar shape or the sheet shape.

In the present embodiment, the configuration is exemplarily described in which RFID tag 15 is laminated and arranged on one end face (front surface) of the magnet forming magnetic marker 10T. In place of this, a configuration may be such that RFID tag 15 is arranged on the outer peripheral surface (back surface or side surface) other than the front surface of the magnet or RFID tag 15 is partially or entirely buried inside the magnet.

Furthermore, when the sheet-shaped magnetic marker as described above is adopted in place of columnar-shaped magnetic marker 10, it can be stuck to road surface 100S, without hole boring in road surface 100S. When the RFID tag is attached to the sheet-shaped magnetic marker, RFID tag 15 may be laminated and arranged on its front surface. Furthermore, a magnetic marker with two magnet sheets laminated together may be adopted. In this case, the RFID tag may be arranged between layers of two magnet sheets.

As magnetic sensor Cn, for example, a magnetic sensor having sensitivity in the longitudinal direction and the vehicle-width direction of vehicle 5 can be adopted. In place of this, magnetic sensor Cn may have sensitivity in any one direction or any two directions in the longitudinal direction, the vertical direction and the vehicle-width direction. The magnetic sensor Cn may have sensitivity in three directions orthogonal to one another. In place of magnetic sensor Cn, an electronic compass may be used to detect the magnetic marker. With the electronic compass, when the vehicle passes over the magnetic marker, it is possible to detect the magnetic marker by sensing a change in direction of magnetism acted from the magnetic marker. The electronic compass included in IMU 22 may be used.

In the present embodiment, measuring unit 2 with sensor array 21 and IMU 22 integrated together is exemplarily described, but both may be configured separately.

Also in the present embodiment, the example is described in which the configuration of vehicular system 1 is applied to vehicle 5 travelling a road, but vehicular system 1 may be applied to a work vehicle or the like for use in a factory, home, or the like.

In the present embodiment, reference magnetic marker 10T is adopted as the reference point. In place of the magnetic marker, a characteristic point on the traveling road that can be identified by the structure of the traveling road or a landmark on the traveling road may be set as the reference point.

As the structure of the traveling road, for example, structures such as branch, merge, and intersection are recited. These structures of the traveling road can be recognized by, for example, an image processing device (one example of a processing circuit) processing a front image taken by an imaging camera. A lidar unit that can measure a distance to a front reflector by using laser light or the like may be used. With the lidar unit, it is possible to detect lane mark 101 with retroreflection characteristics to grasp its shape and recognize the structure of the traveling road such as branch.

As the landmark on the traveling road, for example, a marking on the road surface such as a traffic sign, a road sign, or a crosswalk; a commercial billboard; a traffic guide billboard; and a structure such as a building, a tunnel, or a bridge, and so forth are recited. These landmarks on the traveling road can be recognized by, for example, an image processing device (one example of a processing circuit) processing a front image taken by an imaging camera. As for a billboard or structure, it is possible to recognize it by grasping its three-dimensional structure by a processing device that processes three-dimensional data from a lidar unit or a milliwave radar.

If the operation state of the magnetic sensor is favorable and the laying state of the magnetic markers is favorable, magnetic markers 10 on the route where vehicle 5 have moved are supposed to be detected without omission. In this case, for example, if any magnetic marker is detected after passing over reference magnetic marker 10T, it is supposed that information (count number (count No.)), corresponding to the actual number of times of magnetic markers after detection of reference magnetic marker 10T to detection of any of the above-described magnetic markers, is linked to the attribute information (refer to FIG. 5) of the magnetic marker to which distance information corresponding to the distance traveled by vehicle 5 after passing over reference magnetic marker 10T is linked. In other words, if the states of the magnetic sensor and the magnetic markers are favorable, when any magnetic marker 10 is detected after reference magnetic marker 10T is detected, it is supposed that the attribute information to which the distance information corresponding to the above-described distance traveled by the vehicle is linked and the attribute information to which the count number corresponding to the above-described actual number of times of detection is linked are identical.

By determining whether the attribute information to which the distance information corresponding to the above-described distance traveled by the vehicle is linked and the attribute information to which the count number corresponding to the above-described actual number of times of detection is linked are identical or not, it is possible to determine, in accordance with the determination result, the operation state of the magnetic sensor. A sensor diagnosing part that determines the operation state of the magnetic sensor as described above is preferably provided to, for example, control unit 32.

For example, in accordance with a degree of non-identicality between the attribute information corresponding to the above-described distance traveled by the vehicle and the attribute information corresponding to the above-described actual number of times of detection, the operation state of the magnetic sensor included in measuring unit 2 may be estimated. As a degree of non-identicality, for example, the magnitude of a difference between the count number linked to the attribute information to which the distance information corresponding to the distance travelled is linked and the above-described actual number of detection can be thought. Also for example, the number of times when a determination is made as non-identical can be thought. Also for example, the frequency of making a determination as non-identical can be thought. The frequency may be, for example, a ratio of making a determination as non-identical among the number of times of making a determination whether identical or not. For example, a threshold process is applied to the magnitude of a difference when a determination is made as non-identical, the number of times when a determination is made as non-identical, the frequency of making a determination as non-identical, or the like and, if the result exceeds a threshold value, it is possible to make a determination that there is a possibility or high possibility that the magnetic sensor is not favorable. When a determination as described above is made, it is possible to perform operation such as fault indication or suspension of traveling control using the magnetic markers.

Note that the data map (FIG. 5) of the present embodiment is a data map having recorded thereon attribute information of each of magnetic markers 10 on the route from reference magnetic marker 10T as the starting point to first reference magnetic marker 10T on the downstream side. In place of this, the data map may have recorded thereon the attribute information of each magnetic marker on a route to, for example, second or third reference magnetic marker 10T on the downstream side or on a route in a predetermined distance such as 100 meters on the downstream side. When the data map as described above is adopted, even if omission of magnetic detection of reference magnetic marker 10T or a failure in reading the tag ID occurs, it is possible to identify magnetic marker 10 onward by using the distance traveled. Note that in this case, the data map to be referred is preferably switched when reference magnetic marker 10T is newly detected.

Second Embodiment

The present embodiment is an example in which, based on the vehicular system of the first embodiment, the configuration of the data map is modified so as to support a route including intersection 108, which is one example of a branch position where vehicle 5 can select a course. Details of this are described with reference to FIG. 4 and FIG. 7 to FIG. 9.

Figure 7:
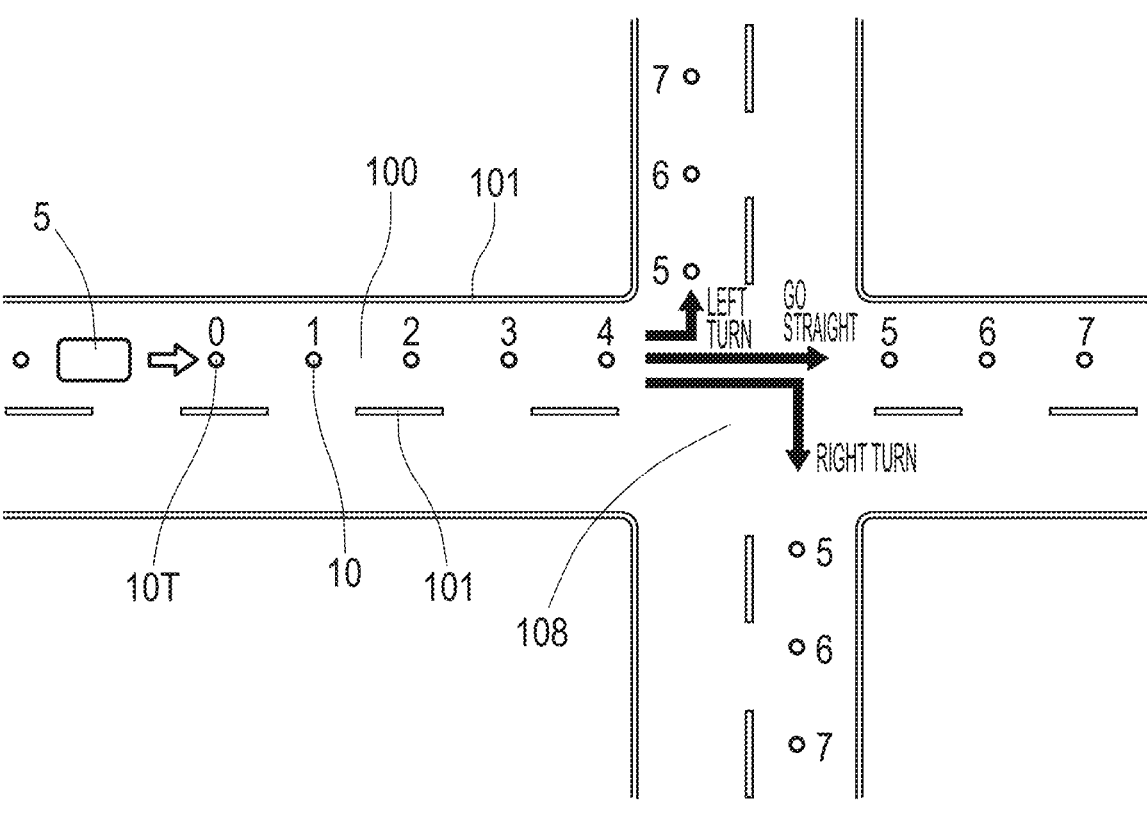
FIG. 7 is a descriptive diagram of a traveling road of the vehicle in a second embodiment.

The vehicular system of the present embodiment can support, for example, a route including intersection 108 as in FIG. 7. Note that a number provided to each magnetic marker 10 in FIG. 7 indicates the ordinal position of magnetic marker 10 by taking reference magnetic marker 10T as the starting point. In the case of the drawing, the vehicle passing over reference magnetic marker 10T passes over four non-reference magnetic markers 10 and then reaches intersection 108. This intersection 108 is a crossroads where roads intersect in the shape of a cross. Vehicle 5 reaching intersection 108 via reference magnetic marker 10T can alternatively select any of the three types of course, that is, a course going straight at intersection 108, a course turning right at intersection 108 for branching, and a course turning left at intersection 108 for branching.

When the course going straight at intersection 108 is selected, the vehicle passing through intersection 108 results in sequentially detecting fifth magnetic marker 10 onward arrayed in the lateral direction in the drawing. When the course turning right at intersection 108 for branching is selected, the vehicle passing through intersection 108 results in sequentially detecting fifth magnetic marker 10 onward arrayed downward in the vertical direction in the drawing. When a course turning left at intersection 108 for branching is selected, the vehicle passing through intersection 108 results in sequentially detecting fifth magnetic marker 10 onward arrayed upward in the vertical direction in the drawing.

In database 36 of vehicular system 1 of the present embodiment, a data map exemplarily depicted in FIG. 8 is stored so as to be able to support the above-described three types of course after passing through intersection 108. In the data map of the drawing, the data map is divided between an upstream side and a downstream side of intersection 108. Furthermore, as the data map on the downstream side, three types of data map are prepared for respective courses individually corresponding to the straight-ahead course, the right-turn course, and the left-turn course.

As a data map by course (FIG. 8), a straight-ahead data map, a left-turn data map, and a right-turn data map are recited. In each data map on the downstream side, attribute information of each magnetic marker 10 in the route after passing through intersection 108 to new reference magnetic marker 10T is recorded.

In the data map of FIG. 8, as information to be linked to the attribute information of each magnetic marker 10, in addition to the information about the distance to each magnetic marker 10 and the count number, a traveling-road azimuth difference is set, which is one example of azimuth information. The traveling-road azimuth difference is an angular difference between a lane direction (traveling-road direction) at the laying position of reference magnetic marker 10T and a lane direction at the laying position of each magnetic marker 10. This angular difference is one example of a relative azimuth in the traveling-road direction at the laying position of magnetic marker 10 with respect to the traveling-road direction at the laying position (reference point) of reference magnetic marker 10T.

Figure 9:
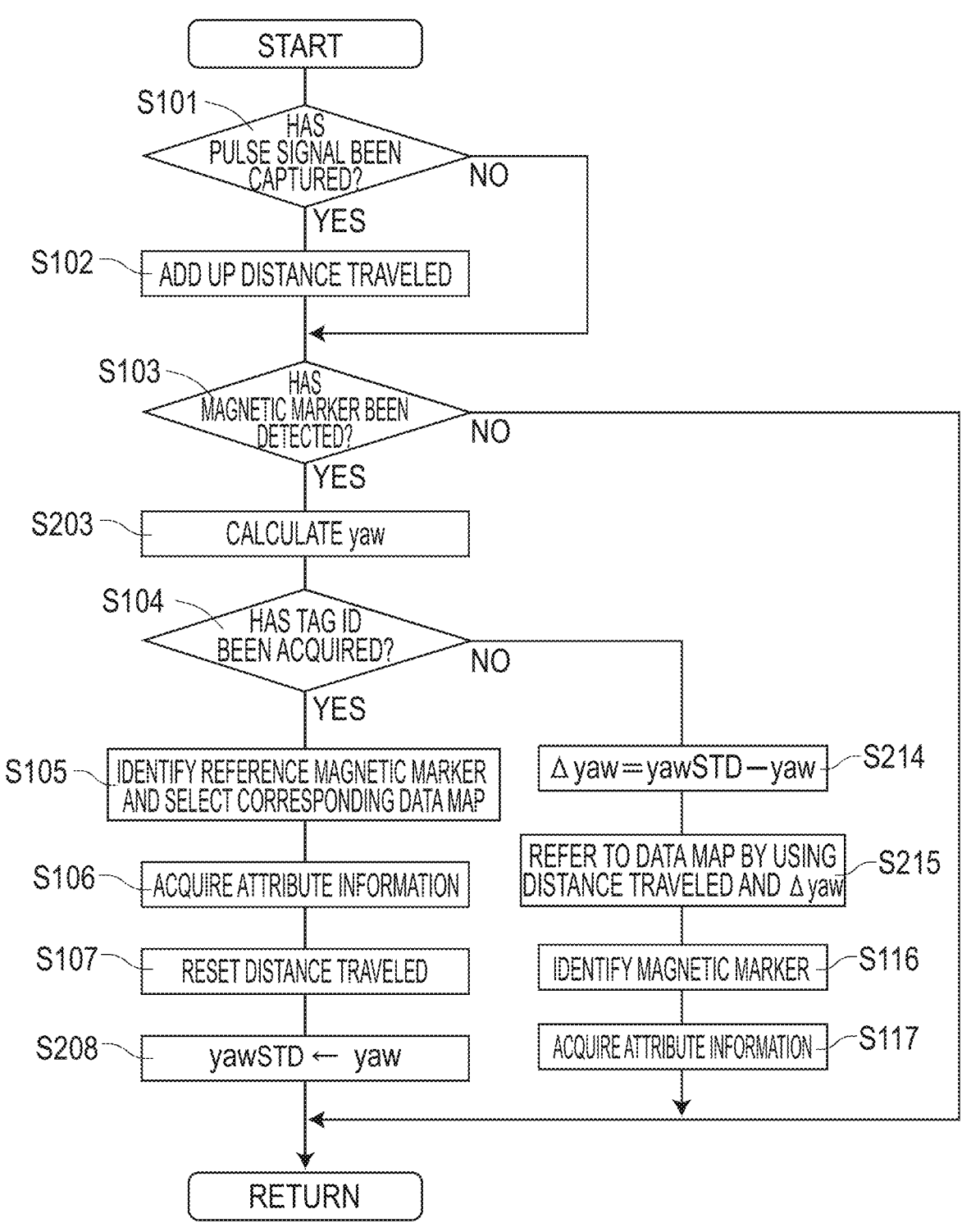
FIG. 9 is a flow diagram depicting a flow of operation of a vehicular system in the second embodiment.

Vehicular system 1 of the present embodiment operates along a flow diagram of FIG. 9. Among step numbers in the drawing, process steps in the 100s such as S101 and S102 are similar to the respective process steps of FIG. 6 referred to in the first embodiment. When magnetic marker 10 is detected (S103: YES), control unit 32 of the vehicular system 1 of the present embodiment calculates by arithmetic operation, yaw angle "yaw" representing a vehicle azimuth (orientation of the vehicle) by using the measurement signal of IMU 22 forming one example of the azimuth estimating part (S203). While yaw angle "yaw" of the present embodiment is an absolute azimuth, it may be a relative azimuth.

When detected magnetic marker 10 is reference magnetic marker 10T and its tag ID is acquired (S104: YES), control unit 32 performs process at steps S105 to S107. In particular, at step S105, control unit 32 identifies reference magnetic marker 10T corresponding to the tag ID and also selects the data map (FIG. 8) to which that tag ID is linked from the data map stored in database 36.

Following steps S105 to S107, control unit 32 performs step S208. At this step S208, control unit 32 stores yaw angle "yaw" calculated at step S203 as yaw STD, which is a reference yaw angle (S208).

Upon detecting non-reference magnetic marker 10 after passing over reference magnetic marker 10T (S103: YES→S203→S104: NO), control unit 32 calculates yaw angle difference Δyaw by subtracting yaw angle "yaw" calculated at step S203 from reference yaw angle yawSTD (S214). This yaw angle difference Δyaw is one example of the relative azimuth representing a change in orientation of vehicle 5 when new magnetic marker 10 is detected, with respect to yaw angle yawSTD representing the vehicle azimuth at the time of passing of reference magnetic marker 10T, which is one example of a reference point. Then, control unit 32 refers to the data map selected at step S105 described above by using the distance traveled being added up and yaw angle difference Δyaw (S215). Note that as for processes following (S104: NO) when a tag ID is not acquired, they are performed after detection of reference magnetic marker 10T. This is because the state is such that a data map to be referred to is not selected before reference magnetic marker 10T is detected.

From among magnetic markers 10 in the data map, control unit 32 identifies, as newly detected magnetic marker 10, a magnetic marker the distance of which linked to the attribution information matches the distance traveled being added up and the linked traveling-route azimuth difference of which matches yaw angle difference Δyaw calculated at step S214 (S116). Then, the attribute information of the identified magnetic marker 10 is read from the data map and acquired (S117).

Here, at step S116 described above, that the traveling-road azimuth difference matches yaw angle difference Δyaw means that the traveling-road azimuth difference, which is one example of azimuth information, can be regarded as matching the yaw angle difference Δyaw by threshold process of applying a threshold value with reference to the traveling-road azimuth difference to the yaw angle difference Δyaw. For example, as the threshold value, on the order of +3 degrees can be set with reference to the traveling-road azimuth difference. For example, when the yaw angle difference Δyaw belongs to a range from (traveling-road azimuth difference-3 degrees) to (traveling-road azimuth difference+3 degrees), it is preferably determined that the traveling-road azimuth difference matches yaw angle difference Δyaw.

For example, a case is assumed that yaw angle difference Δyaw when new magnetic marker 10 is detected after passing over magnetic marker 10 with count number four in FIG. 7 is, for example, 1 degree. In this case, since yaw angle difference Δyaw is in a range of ±3 degrees centered on 3 degrees, which is a traveling-road azimuth difference corresponding to magnetic marker 10 with count number five in the straight-ahead data map, control unit 32 determines that vehicle 5 has traveled through intersection 108 without entering the road branching off from the straight-ahead course. In this case, control unit 32 forming one example of a branch detecting part selects the straight-ahead data map from the three kinds of data map (FIG. 8) on the downstream side of intersection 108, and acquires the attribute information of newly detected magnetic marker 10 (magnetic marker with count number five).

Also for example, a case is assumed that yaw angle difference Δyaw when new magnetic marker 10 is detected after passing over magnetic marker 10 with count number four in FIG. 7 is, for example, 93 degrees (−86 degrees). In this case, since yaw angle difference Δyaw exceeds the range of +3 degrees centered on 3 degrees, which is a traveling-road azimuth difference corresponding to magnetic marker 10 with count number five in the straight-ahead data map, control unit 32 forming one example of the branch detecting part determines that vehicle 5 has traveled through intersection 108 by entering the road branching off from the straight-ahead course.

In this case, control unit 32 refers to the traveling-road azimuth difference regarding magnetic marker 10 with count number five in the right-turn and left-turn data maps (refer to FIG. 8). As described above, when yaw angle difference Δyaw is 93 degrees (−86 degrees), since yaw angle difference Δyaw is in a range of +3 degrees centered on 95 degrees (−85 degrees), which is the traveling-road azimuth difference corresponding to magnetic marker 10 with count number five in the right-turn (left-turn) data map, control unit 32 determines that vehicle 5 has made a right turn (left turn) at intersection 108. From the right-turn (left-turn) data map among the three kinds of data map (FIG. 8) on the downstream side of intersection 108, control unit 32 acquires the attribute information of newly detected magnetic marker 10 (magnetic marker with count number five).

As described above, vehicular system 1 of the present embodiment is a system that can support, for example, the route including intersection 108 of FIG. 7. This vehicular system 1 can support also a vehicle going straight and a vehicle making the right or the left turn at intersection 1108.

Note that branching off from the lane where magnetic markers 10 are arranged may be identified by using the traveling-road azimuth difference in FIG. 8. This configuration is described by taking, as an example, a case in which magnetic marker 10 with count number three in the drawing is detected. The traveling-road azimuth difference linked to the attribute information of magnetic marker 10 with number three is 5 degrees.

Here, for example, threshold values of +3 degrees (2 degree and 8 degree) may be set by taking 5 degrees, which is the traveling-road azimuth difference corresponding to magnetic marker 10 with number three, as a reference, and the threshold process may be applied to yaw angle difference Δyaw when magnetic marker 10 with number three is detected. For example, if yaw angle difference Δyaw when, for example, magnetic marker 10 with number three is detected is smaller than (equal to or smaller than) 2 degree or larger than (equal to or larger than) 8 degrees, it is preferably determined that vehicle 5 has entered a road branching off from the route where magnetic markers 10 are arrayed.

In the configuration of the present embodiment as described above, branching is determined by using the traveling-road azimuth difference, which is the angular difference (one example of a relative azimuth) between the lane direction (traveling-road direction) at the laying position of reference magnetic marker 10T and the lane direction at the laying position of each magnetic marker 10. Yaw angle difference Δyaw to be compared with this traveling-road azimuth difference does not receive an influence of omission of detection of magnetic marker 10. By comparison between the traveling-road azimuth difference and yaw angle difference Δyaw, branching is determined with high reliability even if omission of detection of magnetic marker 10 occurs.

Note that, for example, it is possible to determine branching by the vehicle by using a difference in traveling-road azimuth difference between adjacent two magnetic markers 10. For example, in FIG. 8, the traveling-road azimuth difference regarding magnetic marker 10 with count number two is 3 degrees, the traveling-road azimuth difference regarding magnetic marker 10 with number three is 5 degrees, and its difference is 2 degrees. For example, a difference between yaw angle "yaw" representing a vehicle azimuth when magnetic marker 10 with number two and yaw angle "yaw" representing a vehicle azimuth when magnetic marker 10 with number three may be compared with 2 degrees, which is the above-described difference in traveling-road azimuth difference. When the difference in vehicle azimuth does not match the above-described difference in traveling-road azimuth difference, it is determined that the vehicle has entered a branching road. For the determination as to match or mismatch, an appropriate threshold value is preferably set.

In the present embodiment, as a method of calculating yaw angle "yaw" representing a vehicle azimuth, a method of using a measurement signal by IMU 22, which is one example of the azimuth estimating part, is exemplarily described. Yaw angle "yaw" may be calculated by using a measurement value (yaw rate) of a yaw rate sensor. For example, by temporally integrating measurement values of the yaw rate sensor, it is possible to calculate a fluctuation amount of yaw angle "yaw". By temporally integrating measurement values by the yaw rate sensor after passing over the reference point, it is possible to calculate a displacement (relative azimuth) of the vehicle azimuth with respect to the vehicle direction at the time of passing over the reference point.

Note that in the present embodiment, as azimuth information in the traveling-road direction at the laying position of magnetic marker 10, the relative azimuth with respect to the traveling-road direction at the laying position of reference magnetic marker 10T is adopted. In place of this, an absolute azimuth may be adopted. Also in the present embodiment, as a determination as straight ahead, right turn, or left turn at intersection 108 and a determination of branching from a route, or the like, the relative azimuth representing a change in orientation of vehicle 5 is used, but an absolute azimuth of the orientation of vehicle 5 may be used.

In the present embodiment, as a branch position where vehicle 5 can select a course, intersection 108 is exemplarily described. As the branch position, for example, a position where the road branches off from a main track of an expressway to a byway, a three-went-way, a connecting position of a road branching off from the road where magnetic markers 10 are laid, and so forth are recited. Note that the other configurations and the operation and effects are similar to those in the first embodiment.

In the foregoing, while specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 vehicular system
10 magnetic marker
10T reference magnetic marker
100 lane
100S road surface
15 RFID tag (wireless tag)
2 measuring unit
21 sensor array
212 detection processing circuit
22 IMU (azimuth estimating part)
Cn magnetic sensor
32 control unit (distance identifying part, information acquiring part, branch detecting part)
34 tag reader
36 database
39 wheel speed sensor (distance identifying part)
5 vehicle

The invention claimed is:

1. A vehicular system for acquiring attribute information of magnetic markers laid along a traveling road while a vehicle is traveling, comprising:
   a magnetic sensor attached to the vehicle to detect the magnetic markers;
   a distance identifying part to identify a distance traveled by the vehicle;
   a database having the attribute information of the magnetic marker stored therein; and
   an information acquiring part that acquires the attribute information of a magnetic marker detected by the vehicle by referring to the database, wherein
   the database has stored therein the attribute information of each of the magnetic markers to which information that can identify a distance from a reference point on the traveling road as a starting point to the each of the magnetic markers is linked,
   the information acquiring part refers to the database by using the distance identified by the distance identifying part after the vehicle passes over the reference point until the magnetic marker is detected, and
   the information acquiring part acquires, as attribute information of the magnetic marker detected by the vehicle, attribute information to which information that can identify the distance identified by the distance identifying part is linked, in the attribute information of the magnetic markers stored in the database.

2. The vehicular system in claim 1, wherein the magnetic markers include a reference magnetic marker and a non-reference magnetic marker,
   the vehicular system includes a circuit to determine whether the magnetic marker detected by the magnetic sensor is the reference magnetic marker or the non-reference magnetic marker, and
   the reference point is a point where the reference magnetic marker is laid.

3. The vehicular system in claim 2, wherein a wireless tag that outputs identification information is affixed to the reference magnetic marker, and the vehicular system includes a tag reader attached to the vehicle to receive the identification information from the wireless tag.

4. The vehicular system in claim 1, wherein the reference point is set at a characteristic point on the traveling road that can be identified with a structure of the traveling road or a landmark on the traveling road, and the vehicular system includes a processing circuit mounted on the vehicle to recognize the structure of the traveling road or the landmark of the traveling road.

5. The vehicular system in claim 1, wherein the attribute information of the magnetic markers at least includes position information indicating laying positions of the magnetic markers.

6. The vehicular system in claim 1, wherein the database is configured to include a data map for each reference point to which identification information of the reference point is linked and having recorded thereon at least the attribute information of the magnetic markers laid on a route from the reference point as a starting point to another reference point on a downstream side of the traveling road, and when any magnetic marker is detected after the vehicle passes over any reference point, the information acquiring part refers to the data map corresponding to the any reference point, and acquires attribute information of the any magnetic marker from the attribute information recorded on the data map.

7. The vehicular system in claim 6, wherein when a branch point where the vehicle can select a course is present in the route, the data map is configured to include a data map on an upstream side of the branch point and data maps by courses on a downstream side of the branch point, and in accordance with the course of the vehicle at the branch point, either one data map of the data maps by courses is selected.

8. The vehicular system in claim 1, wherein azimuth information indicating absolute azimuths or relative azimuths in a traveling-road direction at laying positions of the magnetic markers are linked to the attribute information of the magnetic markers, and the vehicular system includes an azimuth estimating part that estimates an absolute azimuth of orientation of the vehicle or a relative azimuth representing a change in the orientation of the vehicle, and a branch detecting part that detects branching of the vehicle by comparing an azimuth indicated by azimuth information linked to the attribute information of the magnetic markers and an azimuth estimated by the azimuth estimating part.

9. The vehicular system in claim 8, wherein the azimuth information is the relative azimuths in the traveling-road direction at the laying positions of the magnetic markers with respect to the traveling-road direction at the reference point, and an estimated azimuth estimated by the azimuth estimating part is a relative azimuth of the change in the orientation of the vehicle when the magnetic marker is detected with reference to the orientation of the vehicle at passing over the reference point.

10. The vehicular system in claim 8, wherein the branch detecting part detects the branching of the vehicle by a threshold process of applying a threshold value set with reference to the azimuth indicated by the azimuth information linked to the attribute information of the magnetic markers to the azimuth estimated by the azimuth estimating part.

11. The vehicular system in claim 1, including a sensor diagnosing part that diagnoses an operation state of the magnetic sensor, wherein the database has stored therein the attribute information of the magnetic markers to which, in addition to linking of information that can identify the distance from the reference point on the traveling road as the starting point to each of the magnetic markers, information that can identify an ordinal position of each of the magnetic markers from the reference point on the traveling road as a starting point is linked, and the sensor diagnosing part is configured to determine, when any magnetic marker is detected after the vehicle passes over the reference point, whether attribute information to which information corresponding to the distance traveled by the vehicle until the any magnetic marker is detected is linked and attribute information to which information corresponding to a number of times of magnetic marker detection until the any magnetic marker is detected is linked are identical or not, and diagnose the operation state of the magnetic sensor in accordance with a determination result.

12. The vehicular system in claim 11, wherein the sensor diagnosing part is configured to diagnose the operation state of the magnetic sensor in accordance with a number of times or frequency of the determination result of non-identical.

13. The vehicular system in claim 3, wherein the circuit to determine determines that, if the identification information has been received from the wireless tag affixed to the magnetic marker detected by the magnetic sensor, the magnetic marker detected is the reference magnetic marker, and the circuit to determine determines that, if the identification information has not been received from the wireless tag affixed to the magnetic marker detected by the magnetic sensor, the detected magnetic marker is the non-reference magnetic marker.

14. The vehicular system in claim 6, including a circuit that identifies the reference point during traveling of the vehicle, wherein the data map for each reference point has recorded thereon attribute information of magnetic markers laid in a route from the reference point corresponding to linked identification information as the starting point over another reference point adjacent on a downstream side of the traveling road to a second reference point further on the downstream side, and the information acquiring part changes the data map to be referred to every time a new reference point is identified by the circuit that identifies the reference point.

15. The vehicular system in claim 7, wherein azimuth information indicating an absolute azimuth or a relative azimuth in a traveling-road direction at laying positions of the magnetic markers is linked to the attribute information of the magnetic markers, the vehicular system includes an azimuth estimating part that estimates an absolute azimuth of orientation of the vehicle or a relative azimuth representing a change in the orientation of the vehicle, and in accordance with a result of comparison between an azimuth indicated by azimuth information linked to the attribute information of the magnetic markers and an azimuth estimated by the azimuth estimating part, the either one data map of the data maps by courses is selected.

16. The vehicular system in claim 2, wherein the database is configured to include a data map for each reference point to which identification information of the reference point is linked and having recorded thereon at least the attribute information of the magnetic markers laid on a route from the reference point as a starting point to another reference point on a downstream side of the traveling road, and when any magnetic marker is detected after the vehicle passes over any reference point, the information acquiring part refers to the data map corresponding to the any reference point, and acquires attribute information of the any magnetic marker from the attribute information recorded on the data map.

17. The vehicular system in claim 6, wherein azimuth information indicating absolute azimuths or relative azimuths in a traveling-road direction at laying positions of the magnetic markers are linked to the attribute information of the magnetic markers, and the vehicular system includes an azimuth estimating part that estimates an absolute azimuth of orientation of the vehicle or a relative azimuth representing a change in the orientation of the vehicle, and a branch detecting part that detects branching of the vehicle by comparing an azimuth indicated by azimuth information linked to the attribute information of the magnetic markers and an azimuth estimated by the azimuth estimating part.

18. The vehicular system in claim 9, wherein the branch detecting part detects the branching of the vehicle by a threshold process of applying a threshold value set with reference to the azimuth indicated by the azimuth information linked to the attribute information of the magnetic markers to the azimuth estimated by the azimuth estimating part.

19. The vehicular system in claim 7, including a sensor diagnosing part that diagnoses an operation state of the magnetic sensor, wherein the database has stored therein the attribute information of the magnetic markers to which, in addition to linking of information that can identify the distance from the reference point on the traveling road as the starting point to each of the magnetic markers, information that can identify an ordinal position of each of the magnetic markers from the reference point on the traveling road as a starting point is linked, and the sensor diagnosing part is configured to determine, when any magnetic marker is detected after the vehicle passes over the reference point, whether attribute information to which information corresponding to the distance traveled by the vehicle until the any magnetic marker is detected is linked and attribute information to which information corresponding to a number of times of magnetic marker detection until the any magnetic marker is detected is linked are identical or not, and diagnose the operation state of the magnetic sensor in accordance with a determination result.

20. The vehicular system in claim 8, including a sensor diagnosing part that diagnoses an operation state of the magnetic sensor, wherein the database has stored therein the attribute information of the magnetic markers to which, in addition to linking of information that can identify the distance from the reference point on the traveling road as the starting point to each of the magnetic markers, information that can identify an ordinal position of each of the magnetic markers from the reference point on the traveling road as a starting point is linked, and the sensor diagnosing part is configured to determine, when any magnetic marker is detected after the vehicle passes over the reference point, whether attribute information to which information corresponding to the distance traveled by the vehicle until the any magnetic marker is detected is linked and attribute information to which information corresponding to a number of times of magnetic marker detection until the any magnetic marker is detected is linked are identical or not, and diagnose the operation state of the magnetic sensor in accordance with a determination result.

* * * * *